United States Patent [19]

Soderberg

[11] Patent Number: 5,333,834
[45] Date of Patent: Aug. 2, 1994

[54] VALVE DRIVER

[75] Inventor: Paul B. Soderberg, Montgomery, Tex.

[73] Assignee: Soderberg Research & Development, Inc., Montgomery, Tex.

[21] Appl. No.: 38,535

[22] Filed: Mar. 29, 1993

[51] Int. Cl.⁵ ............................................. F16K 5/06
[52] U.S. Cl. ....................................... 251/86; 251/309
[58] Field of Search .................. 251/86, 301, 304, 309

[56] References Cited

U.S. PATENT DOCUMENTS

| | | | |
|---|---|---|---|
| 51,274 | 11/1865 | Woodman | 251/301 |
| 341,346 | 5/1886 | Pickering | 251/301 |
| 2,173,949 | 9/1939 | Neveu | 251/86 |
| 3,767,162 | 10/1973 | Olsson | 251/86 X |
| 4,174,090 | 11/1979 | Nelimarkka | 251/86 |
| 4,239,185 | 12/1980 | Lowe | 251/309 X |
| 4,450,854 | 5/1984 | Alexander et al. | 251/309 X |
| 4,519,414 | 5/1985 | Anaya | 251/309 X |
| 4,962,911 | 10/1990 | Soderberg | 251/177 X |

Primary Examiner—Stephen M. Hepperle
Attorney, Agent, or Firm—Browning, Bushman, Anderson & Brookhart

[57] ABSTRACT

The present invention is directed to an improved driver for operatively connecting an actuator to a rotatable valve member disposed in the fluid path of a valve housing. The improved driver of the present invention comprises a drive shaft for connection at one end with an actuator and having a yoke connected to the other end of the drive shaft. The yoke preferably comprises two arms extending on opposite sides of the fluid path through the valve housing. Each arm includes a contact member, e.g., a dog or set screw extending from the arm, for engaging and turning the rotatable valve member while not rigidly connecting the arm with the valve member. In a preferred embodiment, the arms of the yoke extend around the fluid path and are joined together with a trunnion to aid in centering the driver and rotatable valve member. The valve driver of the present invention may be used with ball, plug and hemi-wedge valves to achieve both the sealing advantage of a floating rotatable valve member and the centering advantage of a valve member rigidly connected to the actuator.

29 Claims, 6 Drawing Sheets

VALVE DRIVER

BACKGROUND OF THE INVENTION

1. Field of the Invention

The present invention generally relates to an improved driver for actuating a rotatable valve member. More specifically, the present invention is directed to a new, novel valve driver including a drive shaft and yoke having arms extending about and around the fluid path to loosely engage the rotatable member of a ball, plug or hemi-wedge valve.

2. Description of the Background

Ball valves, plug valves and the like are well known to those skilled in the art. The common characteristics of these valves is that they may be operated from fully open to fully closed by rotation through an angle of not more than about ninety degrees (90°).

A simple plug valve comprises a rotatable, tapered plug having a bore therethrough disposed in a complementary housing. The plug valve permits fluid flow to be fully stopped by rotating the plug not more than about ninety degrees (90°). However, these valves offer only minimal graduated control of fluid flow by setting the plug at intermediate positions and require modification for use in high pressure environments.

A ball valve comprises a rotatable ball having a bore therethrough corresponding to the fluid flow path, together with a seat for sealing with the ball surface. Ball valves operate similarly to the previously described plug valves and offer similar advantages and disadvantages.

Presently lesser known, but offering significant advantages over conventional ball and plug valves, is my hemi-wedge valve described in U.S. Pat. No. 4,962,911, which is hereby incorporated by reference. In short, the hemi-wedge valve includes a rotatable, curved wedge disposed in the fluid path together with a fixed thrust ball for displacing the wedge longitudinally toward the seat as the wedge is rotated between its open and closed positions. The hemi-wedge comprises a wedge having curved sides so that a first, convex side forms a curved sealing surface with the seat of the valve and a second, concave side forms a curved thrust surface for cooperation with a complementary curved, fixed surface on the thrust ball. Further, the thickness of the wedge increases from its leading end to its trailing end. The wedge includes a bore forming a part of the fluid path through its thinner, leading end and is solid at its thicker, trailing end. Rotation of the hemi-wedge through about ninety degrees (90°) gradually closes the fluid path by blocking it with the thicker end of the wedge.

There are basically two systems used for turning the rotatable ball, plug or hemi-wedge of the foregoing valves. The rotatable valve member may be unconnected to or rigidly connected with the actuator. Each system satisfies a need, but neither accomplishes its goals without compromise.

In the first system used to actuate the rotatable member of a quarter-turn valve, the rotatable valve member is turned by an external actuator that is not connected to the ball, plug or hemi-wedge. This arrangement gives the rotatable member the chance to float within certain constraints so that the sealing surface of the rotatable member is able to seek a common sealing area with the valve seat. When this arrangement is employed, it is often necessary to provide pads or external bearing points to help prevent the rotatable member from being forced askew or cocked. If the rotatable valve member, e.g., a ball or plug, is forced askew, unwanted wear, scratching and impairment of the sealing surfaces often results. Cocking of the rotatable member also causes additional friction by rubbing the rotatable member against the inside surfaces of the valve housing, thereby increasing the operating torque required to actuate the valve.

The second system commonly used to actuate the rotatable member of a quarter-turn valve rigidly connects the actuator, and typically a diametrically disposed trunnion, to the rotatable member to prevent unwanted cocking. In this arrangement, a drive shaft and trunnion are rigidly connected to the rotatable member when disposed in a valve housing with a trunnion guide, thus forcing the rotatable member to rotate on the axis or true centerline of the actuating shaft. This configuration eliminates cocking and thus the need for pads or bearing surfaces to maintain the rotatable member centered. However, the rotatable member may no longer float when rigidly connected to the actuator and trunnion. Sealing becomes totally dependent upon pressure in the line or upon movement of the seat into sealing position with the rotatable member.

It is evident that neither of the foregoing described systems provides an ideal drive system. Where the rotatable valve member is permitted to float, it may be easily forced askew, resulting in increased wear to the sealing surfaces and requiring increased operating thrust. Where the rotatable valve member is rigidly connected to a drive shaft with or without a trunnion, the valve member will no longer be susceptible to such cocking. However, this benefit is achieved at the expense of seal integrity.

Accordingly, there has been a long-felt, but unfulfilled need for an improved drive mechanism for the rotatable member of quarter-turn valves, e.g., ball, plug and hemi-wedge valves. Those skilled in the art have long sought and will appreciate the novel and non-obvious features of the present invention and the improved valve resulting therefrom.

SUMMARY OF THE INVENTION

The present invention is directed to an improved driver for operatively connecting an actuator to a rotatable valve member disposed in the fluid path of a valve housing. The present invention is also directed to a quarter-turn valve, e.g., a ball, plug or hemi-wedge valve, incorporating the improved driver of the present invention.

The improved driver of the present invention comprises a drive shaft for operative connection at one end with an actuator and having a yoke connected to the other end of the drive shaft. The yoke comprises at least two arms extending on opposite sides of the fluid path. Each arm includes means for contacting the rotatable valve member to move it between the open and closed positions. Preferred contacting means include dogs or set screws extending from the arm toward the rotatable valve member for engaging cooperating slots or bores. These cooperating slots or bores are larger than the dogs or set screws so that the driver is not rigidly connected to the rotatable valve member. The dogs or set screws loosely transmit the actuating force from the driver to the rotatable valve member while permitting the valve member to float into a preferred sealing engagement.

In a presently preferred embodiment of the present invention, the arms of the yoke extend around the fluid path and are joined together with a trunnion to aid in centering the driver and rotatable valve member. Preferably, the arms of the yoke will not cross or enter the fluid path when rotating the valve member between the open and closed positions. In a presently preferred embodiment the yoke comprises two arms substantially diametrically disposed across the fluid path. In one of the presently preferred embodiments the contacting means comprises pairs of set screws, the set screws of each pair being substantially diametrically disposed with one set screw of each pair extending from each of the diametrically disposed arms.

By providing a means to loosely connect the rotatable valve member with the valve driver, the valve driver of the present invention is able to achieve the advantages of both conventional actuator systems described above. The valve driver of the present invention retains the rotatable valve element in a substantially centered orientation to prevent cocking while permitting limited free movement so that the sealing surface is able to float into a preferred sealing engagement with the valve seat.

A BRIEF DESCRIPTION OF THE DRAWINGS

Other features and intended advantages of the present invention will be readily apparent by reference to the following detailed description in connection with the accompanying drawings wherein.

While the invention will be described in connection with the presently preferred embodiment, it will be understood that it is not intended to limit the invention to this embodiment. On the contrary, it is intended to cover all alternatives, modifications and equivalents as may included in the spirit of the invention and as defined in the appended claims.

DETAILED DESCRIPTION OF THE PREFERRED EMBODIMENT

The present invention is a new, novel valve driver for use in turning the rotatable valve member of a ball, plug or hemi-wedge valve. The valve driver of the present invention combines the features and advantages of a conventional free-floating valve element with those of a conventional valve element rigidly connected to an actuator and trunnion. The present invention provides a valve whose rotatable valve member is maintained centered along the actuator axis to avoid cocking while being sufficiently free to float into sealing engagement with the valve seat. These benefits are achieved by loosely holding the rotatable valve member within the yoke or cradle of the valve driver of the present invention.

Figure 1:
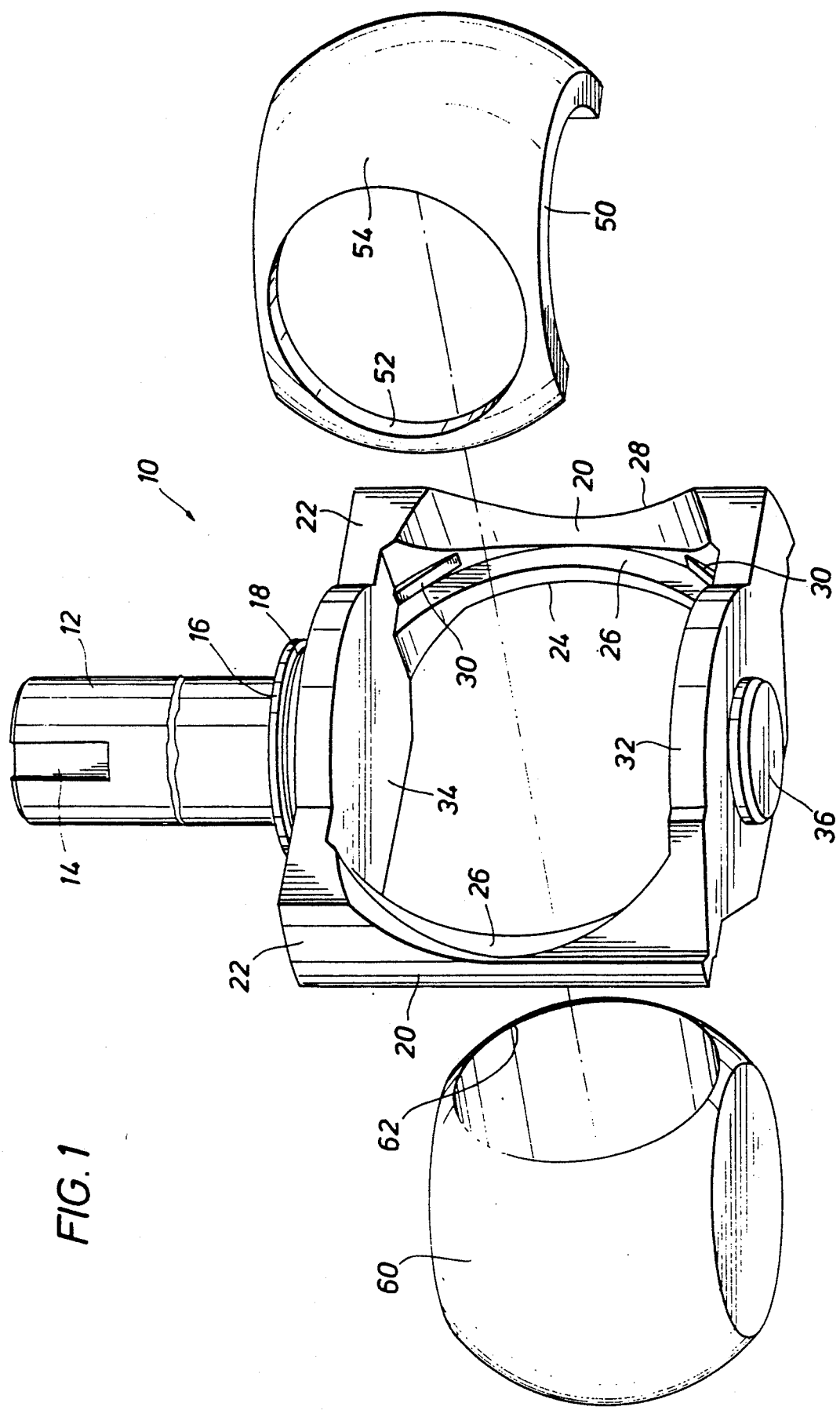
FIG. 1 is an exploded perspective view illustrating a driver in accord with the present invention, together with the thrust ball and hemi-wedge from the valve of FIG. 4.
Figure 2:
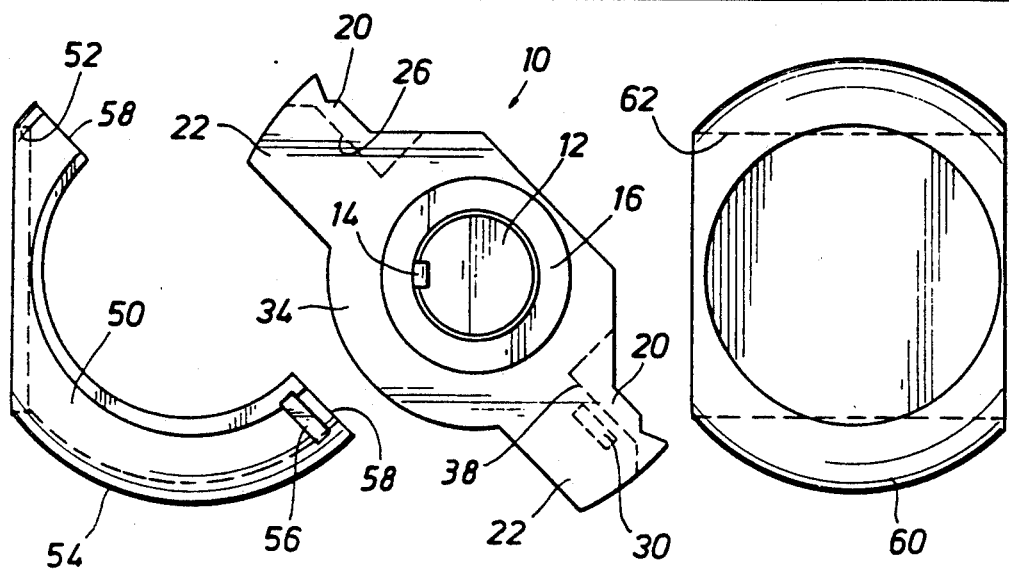
FIG. 2 is a top view illustrating from left to right the hemi-wedge, the driver in accord with the present invention and the thrust ball of FIG. 1.
Figure 3:
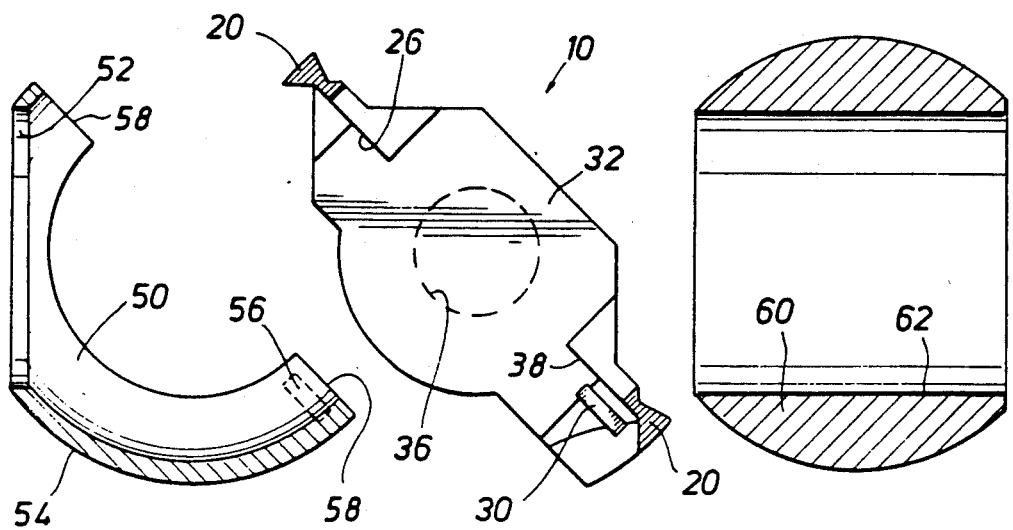
FIG. 3 is a cross-sectional illustration from left to right of the hemi-wedge, the driver in accord with the present invention and the thrust ball of FIGS. 1 and 2.

A valve driver 10 in accord with the present invention is illustrated in FIGS. 1–3 in relation to hemi-wedge 50 and thrust ball 60 typical of those disclosed in my improved hemi-wedge valve as described and claimed in U.S. Pat. No. 4,962,911, which has been incorporated herein by reference. The construction, operation and advantages of my hemi-wedge valve are set forth in detail in the specification of the '911 patent and those unfamiliar with the hemi-wedge valve are referred thereto. Briefly, the hemi-wedge valve is opened and closed by rotation of the hemi-wedge 50 through an angle of about ninety degrees (90°) over the curved surface of fixed thrust ball 60. The curved sealing surface 54 is driven into sealing engagement with replaceable seat element 128 on seat insert 120.

The valve driver 10 of the present invention comprises drive shaft 12 having keyway 14 at one end thereof for cooperation with any conventional external actuator (not shown). Drive shaft 12 terminates at its other end in a yoke or cradle having a top plate 34 with shoulders 22 from which arms 20 are suspended. Arms 20 are positioned to straddle the fluid flow path through the valve 100. In the presently preferred embodiments arms 20 are positioned so that they do not enter or cross the fluid path during rotation of the rotatable valve member, e.g., hemi-wedge 50, between the open and closed positions. In the presently most preferred embodiment, arms 20 are joined around the fluid flow path to bottom plate 32 of driver 10. In that embodiment, driver 10 further includes a trunnion 36 on the exterior of bottom plate 32 and aligned with drive shaft 12 for use in centering both the driver and carried rotatable valve member within valve 100. Trunnion 36 assists in centering valve driver 10 and thus the rotatable valve member, e.g., hemi-wedge 50, in conjunction with trunnion guide 136 of housing 102. See FIG. 4. Central opening 24 between arms 20 of driver 10 is designed to receive thrust ball 60. Fixed thrust ball 60 includes central bore 62 which forms a part of the fluid pathway through valve 100.

Driver 10 further includes one or more dogs 30 positioned to engage cooperating slots 56 in hemi-wedge 50. Dogs 30, along with contact surfaces 26 and 38, transmit the actuating force applied to driver 10 to the rotatable valve member, e.g., hemi-wedge 50. Dogs 30 are smaller than slots 56 so that they are able to move freely therein. Accordingly, dogs 30 do not rigidly connect arms 20 and driver 10 to hemi-wedge 50. Thus, the rotatable valve member, e.g., hemi-wedge 50, is free to float to seek the best seal with seat element 128. In a presently preferred embodiment, a plurality of dogs 30 is employed to more evenly distribute the actuating force applied to hemi-wedge 50 by driver 10. Contact surfaces 26 of driver 10 contact and push contact surfaces 58 of hemi-wedge 50 between the open and closed positions. When closing the valve, the actuating force is transmitted through driver 10 to hemi-wedge 50 via contact surface 38 to push hemi-wedge 50 to the closed position. When opening the valve, the actuating force is transmitted through driver 10 to hemi-wedge 50 via contact surface 26 to push hemi-wedge 50 to the open position. However, the opening force is also transmitted to hemi-wedge 50 via dogs 30 which pull the hemi-wedge via slots 56. By both pushing and pulling the hemi-wedge, driver 10 prevents the hemi-wedge from becoming cocked.

Figure 4:
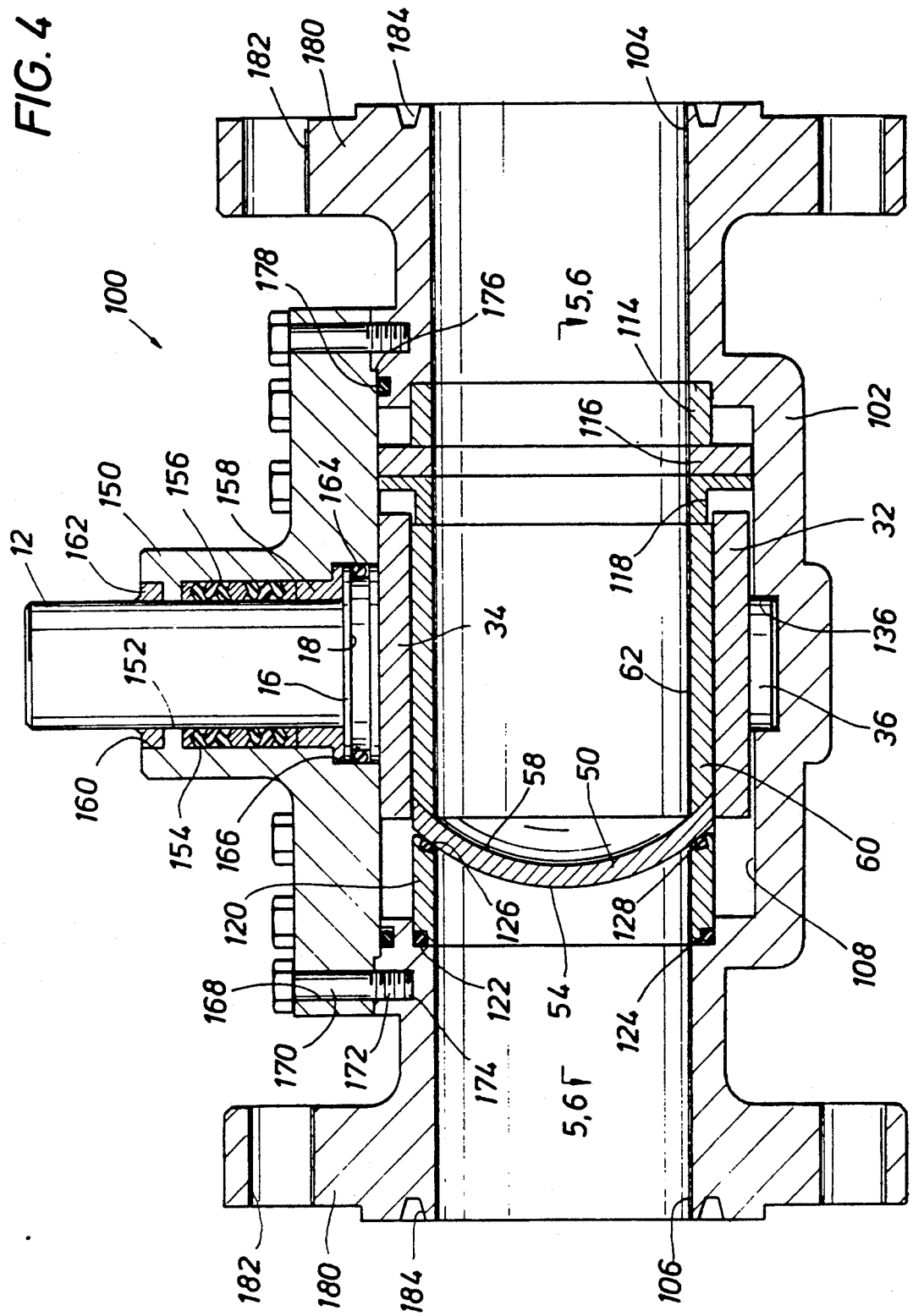
FIG. 4 is a cross-sectional illustration along the flow path of a spherical, hemi-wedge valve including a driver in accord with the present invention.
Figure 5:
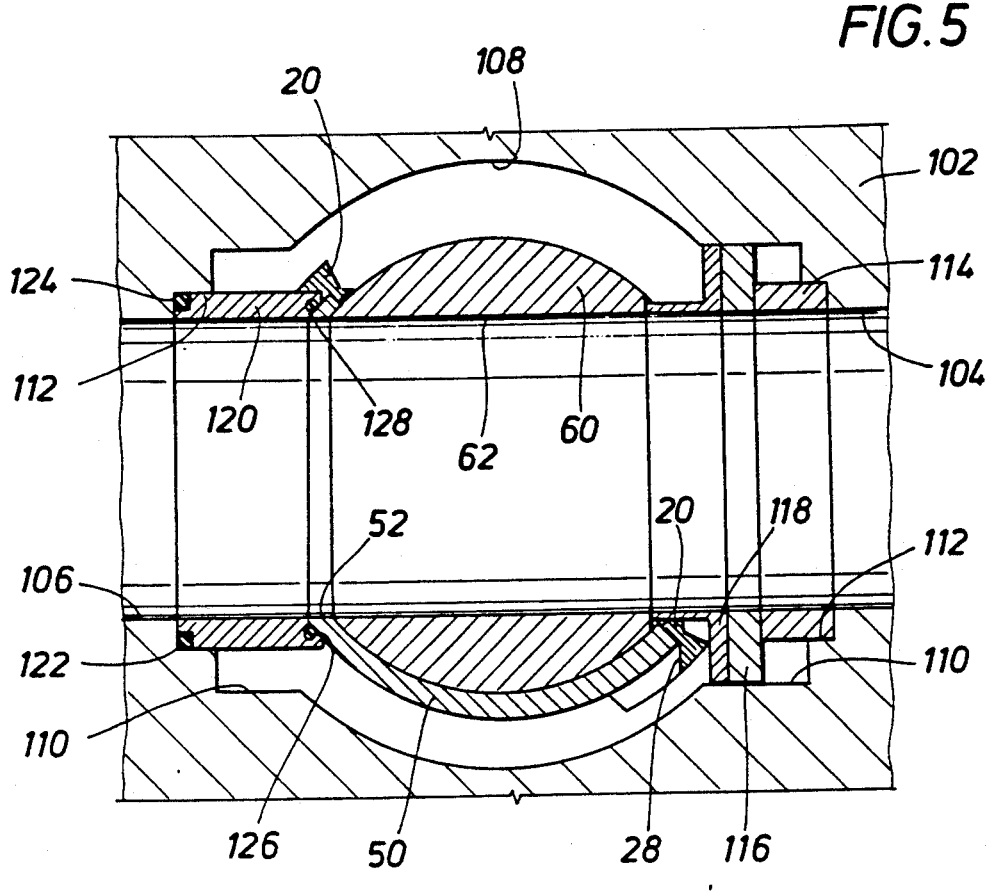
FIG. 5 is a cross-sectional representation along the line 5—5 of FIG. 4 illustrating a spherical, hemi-wedge valve member and thrust ball carried by a driver in accord with the present invention in the fully open position.
Figure 6:
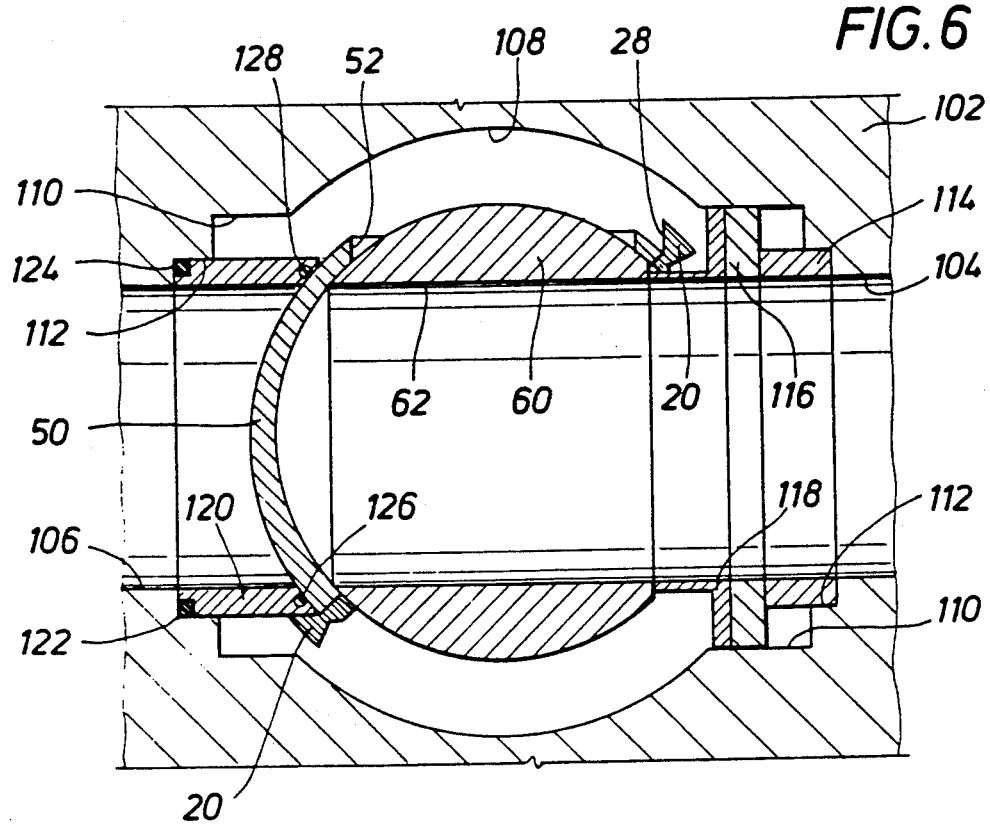
FIG. 6 is a cross-sectional representation along the line 6—6 of FIG. 4 illustrating a spherical, hemi-wedge valve member and thrust ball carried by a driver in accord with the present invention in the fully closed position.

The location of driver 10 within valve 100 and its use in actuating a hemi-wedge valve of the type described in the '911 patent will be explained in detail with reference to FIGS. 4-6. FIG. 4 illustrates a hemi-wedge valve 100 in vertical cross-section. FIGS. 5 and 6 through lines 5—5 and 6—6 of FIG. 1 illustrated in horizontal cross-section the valve, respectively, in the open and closed positions.

Valve 100 comprises valve housing 102 having a fluid path therethrough from inlet conduit 104 to outlet conduit 106. Valve housing 102 includes central cavity 108 between inlet conduit 104 and outlet conduit 106. Central cavity 108 holds and facilitates assembly of the internal components of valve 100. Extending along the fluid pathway from central cavity 108 in the direction of outlet conduit 106 is counterbore 112 for receiving seat insert 120 therein. Seat insert 120 includes groove 122 for receiving O-ring seal 124 for sealing engagement within counterbore 112 of housing 102. The inner end of seat insert 120 is curved to cooperate with the curved sealing surface 54 of hemi-wedge 50. The curved surface of seat insert 120 includes groove 126 for receiving replaceable seat element 128. Extending along the fluid pathway from central cavity 108 in the direction of inlet conduit 104 is counterbore 112 for receiving outer spacer 114 and larger counterbore 110 for receiving middle spacer 116 and inner spacer 118. Disposed within central cavity 108 is thrust ball 60 and hemi-wedge 50, both carried within the yoke of driver 10 defined by arms 20, bottom plate 32 and top plate 34. One of the stop surfaces 28 on arms 20 of driver 10 contact seat insert 120 when hemi-wedge 50 is in the fully open or fully closed position.

After assembly of the internal valve elements, central cavity 108 of valve 100 is closed with housing cap 150. Cap 150 includes about its periphery a plurality of bores 168 for receiving securing bolts 170. Bolts 170 are threaded 172 for securing housing cap 150 to housing 102 by threaded engagement with a plurality of cooperating bores 174 in the top of housing 102. An O-ring 178 disposed in groove 176 provides a seal between housing 102 and housing cap 150. Housing cap 150 also includes actuator port 152 therethrough for receiving drive shaft 12. Extending from the interior surface of housing cap 150 and concentric with actuator port 152 is counterbore 154 for receiving packing material 156 and packing element 158 for sealing about drive shaft 12. Also concentric with counterbore 154 is larger counterbore 166 for sealingly engaging O-ring 164 to further seal central cavity 108. The O-ring 164 is carried in groove 18 about the periphery of flange 16 on drive shaft 12. Housing cap 150 includes external counterbore 160 concentric with actuator port 152 for receiving conventional weatherseal 162.

Disposed on the ends of housing 102 are flanges 180 extending outwardly about inlet conduit 104 and outlet conduit 106. Flanges 180 include therein a plurality of bores 182 for receiving bolts (not shown) to facilitate conventional installation of valve 100 within a conventional pipeline or other fluid pathway. Housing 102 further includes tapered grooves 184 concentrically disposed in the outwardly facing sides of flanges 180 about inlet conduit 104 and outlet conduit 106 for receiving conventional O-rings or other sealing elements (not shown).

Figure 7:
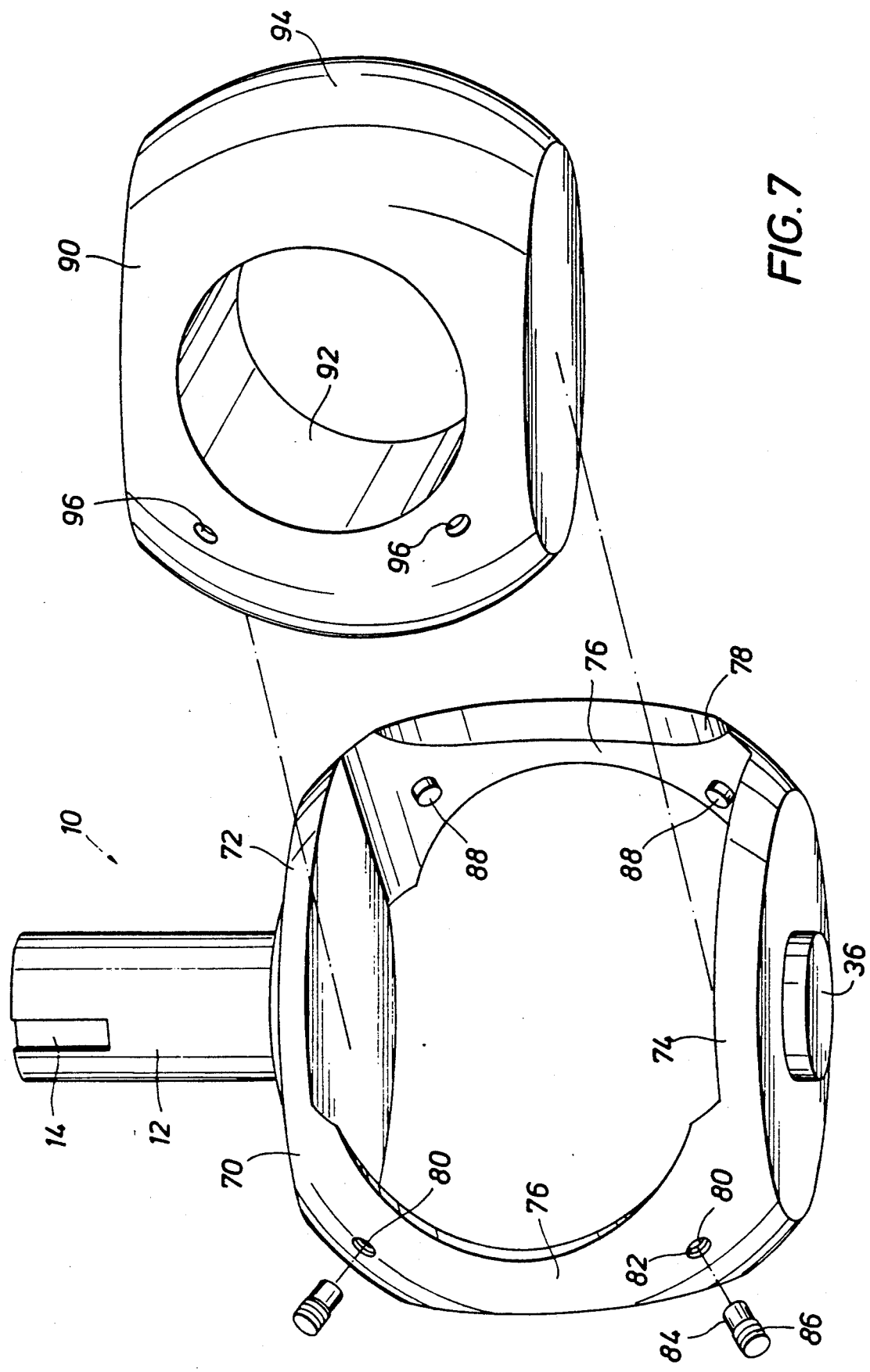
FIG. 7 is an exploded perspective view of a driver in accord with the present invention, together with the ball of a ball valve to be carried therein.
Figure 8:
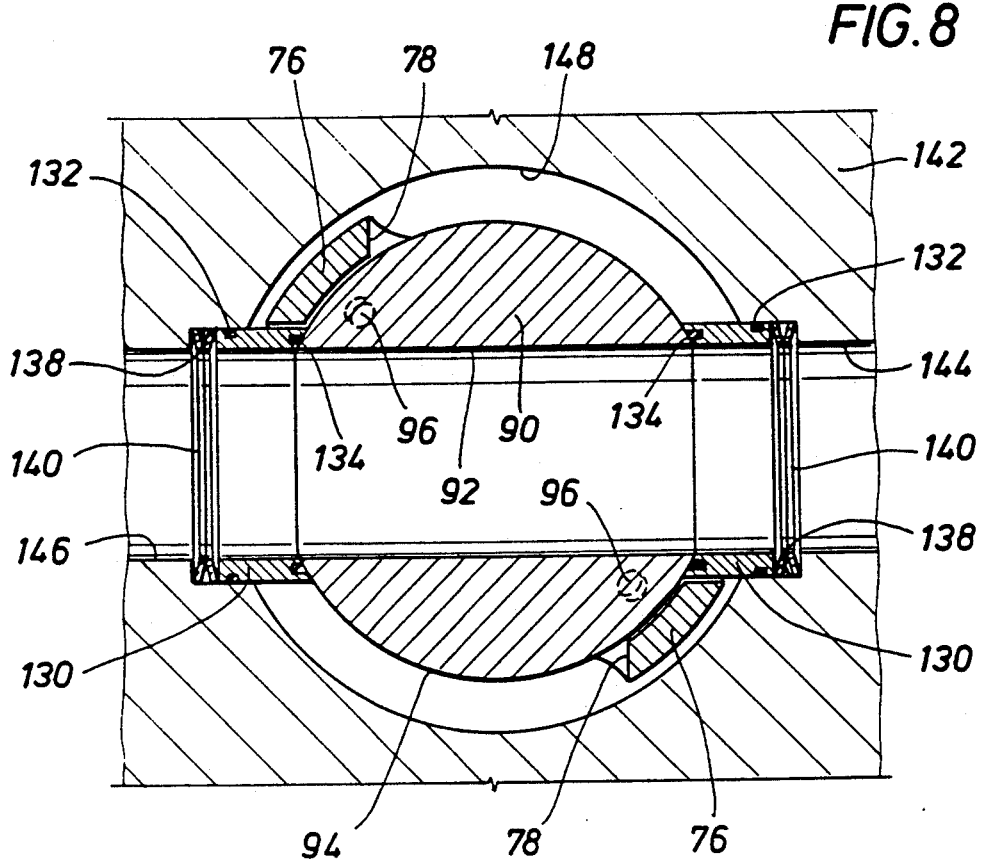
FIG. 8 is a cross-sectional representation of a ball valve illustrating a driver in accord with the present invention carrying the rotatable ball of the ball valve in the fully open position.
Figure 9:
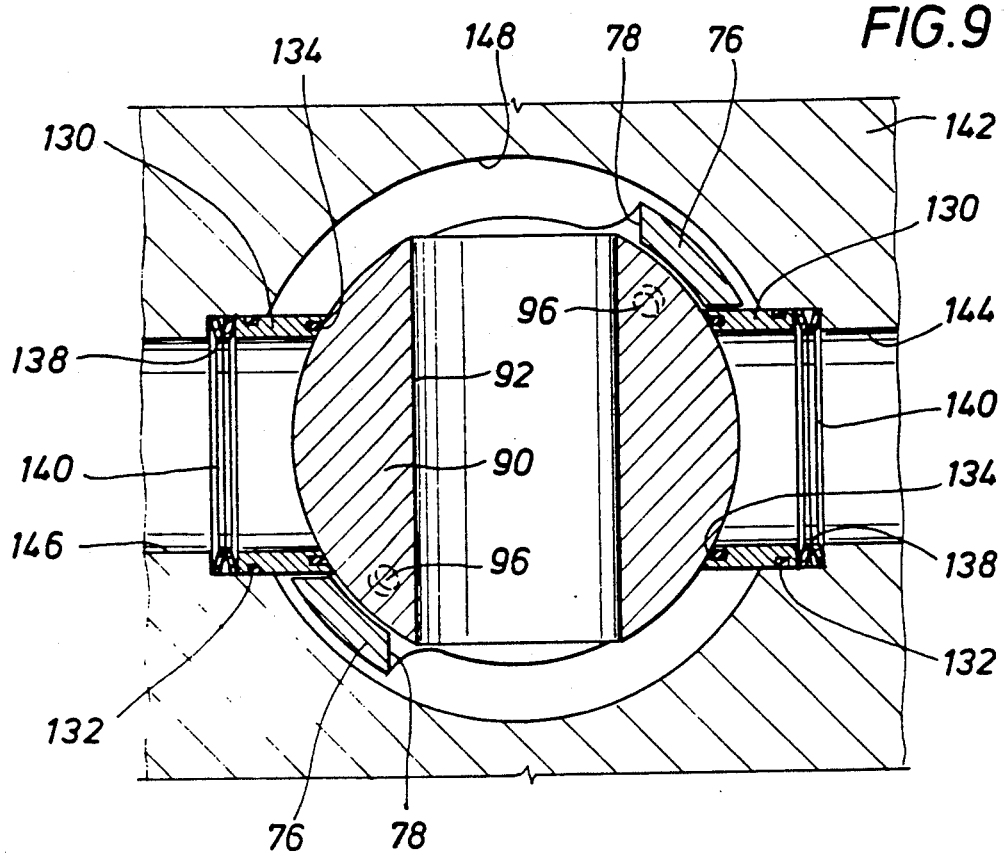
FIG. 9 is cross-sectional representation of a ball valve illustrating a driver in accord with the present invention carrying the rotatable ball of the ball valve in the fully closed position.

FIGS. 7-9 illustrate an alternative embodiment of valve driver 10 of the present invention that is intended for use in a conventional ball or plug valve. FIGS. 7-9 illustrate valve driver 10 configured for use with ball 90 of a conventional ball valve. FIG. 8 illustrates the ball in the open position, while FIG. 9 illustrates the ball in the closed position. Those skilled in the art could readily configure a design in accord with the present invention for use with a conventional plug valve.

Valve driver 10 of FIG. 7 includes drive shaft 12 have keyway 14 at one end thereof for cooperation with a keyed actuator (not shown) to operate the valve. Extending from the opposite end of drive shaft 12 is cradle or yoke 70 comprised of top plate 72, arms 76 extending downwardly therefrom around the fluid pathway and connected by bottom plate 74. Trunnion 36 is disposed on the exterior of bottom plate 74 of cradle 70 and in alignment with the axis of drive shaft 12.

Cradle 70 is loosely connected to ball 90 by a plurality of set screws 84 extending from a plurality of bores 80 in arms 76 toward ball 90. Bores 80 are threaded 82 for receiving set screws 84 which are threaded on at least end 86 and extend from the other end 88 inwardly beyond the interior surface of arms 76. The extended portion 88 of set screws 84 are intended to loosely engage cooperating bores 96 in the exterior surface of ball 90. Ball 90 is further characterized by bore 92 which forms a portion of the fluid path in the open position and by curved sealing surface 94. Both the diameter and depth of bores 96 in ball 90 are greater than the diameter and extended portion 88 of set screws 84. Accordingly, while ball 90 will be carried and retained within cradle 70 of valve driver 10, there will be no rigid connection therebetween. The actuating force applied to valve driver 10 is transmitted to ball 90 through set screws 84 and bores 96. However, loose engagement therewith permits ball 90 to float to a preferred seal while generally maintaining ball 90 centered on the axis of drive shaft 12.

FIGS. 8 and 9 illustrate ball valve cradle 70 within housing 142 of a conventional ball valve in the open and closed positions, respectively. Housing 142 includes inlet conduit 144 in fluid communication with outlet conduit 146 through central cavity 148. Extending toward inlet conduit 144 and outlet conduit 146 from central cavity 148 are substantially identical counterbores 138 for receiving therein seat inserts 130. Seat inserts 130 include near their outer ends O-ring seals 132 for sealing engagement with counterbores 138 of housing 142. Disposed on the inner, curved surface of seat inserts 130 are replaceable seat elements 134 for sealing engagement with the curved surface of ball 90. Seat inserts 130 with seat elements 134 are urged toward ball 90 to maintain good sealing engagement by Bellville springs or other conventional biasing means disposed in the ends of counterbores 138. One of stop surfaces 78 on arms 76 engage seat inserts 130 in the fully open and closed positions.

The foregoing description of the invention has been directed in primary part to a particular, preferred embodiment in accordance with the requirements of the patent statutes and for purposes of illustration. It will be apparent, however, to those skilled in the art that many modifications and changes in the specifically described valve driver 10 may be made without departing from the scope and spirit of the invention. For example, yoke or cradle 70 need not be closed with bottom 74 connecting arms 76, particularly if driver 10 will not include trunnion 36. Further, while it is preferred to employ at least two spaced dogs 30 as the engaging means on each arm with the dogs disposed in locations to equally distribute the actuating force from the driver to the rotatable valve member 50 or 90, alternative embodiments may employ any number of dogs or engaging means. Therefore, the invention is not restricted to the preferred embodiment illustrated but covers all modifications that may fall within the scope of the following claims.

What is claimed is:

1. An improved valve, comprising:
   a valve housing having a fluid inlet, a fluid outlet, a fluid path through said housing from said inlet to said outlet, and an actuator port;
   a valve seat disposed about said fluid path between said inlet and said outlet;
   a rotatable valve member including a curved sealing surface for cooperation with said valve seat for opening and closing said fluid path, said member having an opening therethrough for alignment with said fluid path in an open position and a solid section for blocking said fluid path in a closed position;
   means for actuating said valve member through said actuator port;
   means for sealing said actuator port; and
   a driver for operatively connecting said actuator means to said rotatable valve member, said driver comprising:
   a drive shaft operatively connected at one end to said actuator means;
   a yoke operatively connected to said drive shaft and having at least two arms extending on opposite sides of said fluid path, each arm including means for contacting said valve member to rotate said valve member between said open and closed positions, none of said means for contacting being rigidly connected with said rotatable valve member; and
   said means for contacting comprising at least one set screw extending through at least one said arm toward said rotatable valve member for engaging a cooperating bore on said valve member, the diameter of said set screw being smaller than the diameter of said cooperating bore so that said arm and said valve member are not rigidly connected and said set screw is free to move within said bore.

2. The improved valve of claim 1 wherein said means for contacting comprises at least one dog disposed on at least one of said arms for engaging a cooperating slot in said rotatable valve member, said dog being smaller than said slot so that said arm and said valve member are not rigidly connected and said dog is free to move within said slot.

3. The improved valve of claim 1 wherein each said arm includes a plurality of said set screws cooperating with a plurality of said bores in said rotatable valve member.

4. The improved valve of claim 1 wherein said yoke comprises two arms substantially diametrically disposed across said fluid path.

5. The improved valve of claim 4 including at least one pair of said set screws, the set screws of each said pair being substantially diametrically disposed with one said set screw of each said pair extending from each said arm.

6. The improved valve of claim 1 wherein said drive shaft and said yoke comprise a single unit.

7. The improved valve of claim 1 wherein said arms completely encircled said fluid path and are joined to form a cradle for holding said rotatable valve member.

8. The improved valve of claim 1 wherein said arms do not enter said fluid path when rotating said valve member between said open and closed portions.

9. A driver for operatively connecting an actuator to a rotatable valve member disposed in the fluid path of a valve housing, comprising:
   a drive shaft for operative connection at one end with said actuator; and
   a yoke operatively connected to said drive shaft and having at least two arms completely encircling said fluid path and joined to form a cradle for holding said rotatable' valve member, each arm including means for contacting said valve member to rotate said valve member between an open position and a closed position, none of said means for contacting being rigidly connected with said rotatable valve member.

10. The driver of claim 9 wherein said means for contacting comprises at least one dog disposed on at least one of said arms for engaging a cooperating slot in said rotatable valve member, said dog being smaller than said slot so that said arm and said valve member are not rigidly connected and said dog is free to move within said slot.

11. The driver of claim 9 wherein said means for contacting comprises at least one set screw extending through at least one said arm toward said rotatable valve member for engaging a cooperating bore on said valve member, the diameter of said set screw being smaller than the diameter of said cooperating bore so that said arm and said valve member are not rigidly connected and said set screw is free to move within said bore.

12. The driver of claim 11 wherein each said arm includes a plurality of said set screws cooperating with a plurality of said bores in said rotatable valve member.

13. The driver of claim 11 wherein said yoke comprises two arms substantially diametrically disposed across said fluid path.

14. The driver of claim 13 including at least one pair of said set screws, the set screws of each said pair being substantially diametrically disposed with one said set screw of each said pair extending from each said arm.

15. The driver of claim 9 wherein said drive shaft and said yoke comprise a single unit.

16. The driver of claim 9 wherein said cradle further comprises a trunnion extending outwardly from the joined ends of said arms along the axis of said drive shaft.

17. An improved valve, comprising:
a valve housing having a fluid inlet, a fluid outlet, a fluid path through said housing from said inlet to said outlet, and an actuator port;
a valve seat disposed about said fluid path between said inlet and said outlet;
a rotatable valve member including a curved sealing surface for cooperation with said valve seat for opening and closing said fluid path, said member having an opening therethrough for alignment with said fluid path in an open position and a solid section for blocking said fluid path in a closed position;
means for actuating said valve member through said actuator port;
means for sealing said actuator port; and
a driver for operatively connecting said actuator means to said rotatable valve member, said driver comprising:
a drive shaft operatively connected at one end to said actuator means; and
a yoke operatively connected to said drive shaft and having at least two arms completely encircling said fluid path and joined to form a cradle for holding said rotatable valve member, each arm including means for contacting said valve member to rotate said valve member between said open and closed positions, none of said means for contacting being rigidly connected with said rotatable valve member.

18. The improved valve of claim 17 wherein said cradle further comprises a trunnion extending outwardly from the joined ends of said arms along the axis of said drive shaft; and
said housing further comprises a guide for receiving said trunnion, said guide aligned with and diametrically disposed across said fluid path from said drive shaft.

19. The improved valve of claim 18 wherein said means for contacting comprises at least one set screw extending through at least one said arm toward said rotatable valve member for engaging a cooperating bore on said valve member, the diameter of said set screw being smaller than the diameter of said cooperating bore so that said arm and said valve member are not rigidly connected and said set screw is free to move within said bore.

20. The improved valve of claim 18 wherein said trunnion extends through said housing for connection with a second means for actuating said valve member.

21. The improved valve of claim 18 wherein said arms do not enter said fluid path when rotating said valve member between said open and closed positions.

22. The improved valve of claim 21 wherein said valve member is rotatable between said open and closed positions in not more than ninety degrees (90° C.).

23. The improved valve of claim 22 wherein said valve member is selected from the group consisting of a ball, a plug and a hemi-wedge.

24. The improved valve of claim 18 wherein said means for contacting comprises at least one dog disposed on at least one of said arms for engaging a cooperating slot in said rotatable valve member, said dog being smaller than said slot so that said arm and said valve member are not rigidly connected and said dog is free to move within said slot.

25. A driver for operatively connecting an actuator to a rotatable valve member disposed in the fluid path of a valve housing, comprising:
a drive shaft for operative connection at one end with said actuator;
a yoke operatively connected to said drive shaft and having at least two arms extending on opposite sides of said fluid path, each arm including means for contacting said valve member to rotate said valve member between an open position and a closed position, none of said means for contacting being rigidly connected with said rotatable valve member; and
said means for contacting comprising at least one set screw extending through at least one said arm toward said rotatable valve member for engaging a cooperating bore on said valve member, the diameter of said set screw being smaller than the diameter of said cooperating bore so that said arm and said valve member are not rigidly connected and said set screw is free to move within said bore.

26. The driver of claim 25 wherein said arms completely encircle said fluid path and are joined to form a cradle for holding said rotatable valve member.

27. The driver of claim 26 wherein said cradle further comprises a trunnion extending outwardly from the joined ends of said arms along the axis of said drive shaft.

28. The driver of claim 26 wherein said cradle further comprises a trunnion extending outwardly from the joined ends of said arms along the axis of said drive shaft.

29. The driver of claim 25 wherein said means for contacting comprises at least one dog disposed on at least one of said arms for engaging a cooperating slot in said rotatable valve member, said dog being smaller than said slot so that said arm and said valve member are not rigidly connected and said dog is free to move within said slot.

* * * * *

UNITED STATES PATENT AND TRADEMARK OFFICE
CERTIFICATE OF CORRECTION

PATENT NO. : 5,333,834
DATED     : August 2, 1994
INVENTOR(S) : Paul B. Soderberg It is certified that error appears in the above-indentified patent and that said Letters Patent is hereby corrected as shown below:

In column 10, line 6, delete "C.".

Signed and Sealed this

Twenty-seventh Day of December, 1994

Attest:

BRUCE LEHMAN

Attesting Officer    Commissioner of Patents and Trademarks